(12) United States Patent
Hashimoto et al.

(10) Patent No.: US 7,618,339 B2
(45) Date of Patent: Nov. 17, 2009

(54) HYDRAULIC TENSIONER WITH IMPROVED RELIEF VALVE

(75) Inventors: Hiroshi Hashimoto, Osaka (JP); Yoshio Kurokawa, Osaka (JP); Tsutomu Namie, Osaka (JP); Kazuyuki Iwata, Saitama-ken (JP)

(73) Assignees: Tsubakimoto Chain Co., Osaka (JP); Honda Motor Co., Ltd., Tokyo (JP)

( * ) Notice: Subject to any disclaimer, the term of this patent is extended or adjusted under 35 U.S.C. 154(b) by 634 days.

(21) Appl. No.: 11/214,543

(22) Filed: Aug. 30, 2005

(65) Prior Publication Data

US 2006/0089221 A1 Apr. 27, 2006

(30) Foreign Application Priority Data

Oct. 26, 2004 (JP) ............................. 2004-310946

(51) Int. Cl.
*F16H 7/08* (2006.01)
(52) U.S. Cl. .................. 474/109; 474/110; 474/111
(58) Field of Classification Search ................. 474/109, 474/110, 135, 111, 136, 138
See application file for complete search history.

(56) References Cited

U.S. PATENT DOCUMENTS

| 5,653,651 | A | 8/1997 | Kawashima et al. |
| 6,322,468 | B1 | 11/2001 | Wing et al. |
| 6,361,458 | B1 * | 3/2002 | Smith ......................... 474/109 |
| 6,383,103 | B1 * | 5/2002 | Fujimoto et al. ............ 474/110 |
| 6,398,682 | B1 | 6/2002 | Suzuki et al. |
| 6,435,993 | B1 | 8/2002 | Tada |
| 6,592,479 | B2 * | 7/2003 | Nakakubo et al. ........... 474/109 |
| 7,070,528 | B2 | 7/2006 | Emizu et al. |
| 2002/0052259 | A1 | 5/2002 | Nakakubo et al. |
| 2004/0087399 | A1 * | 5/2004 | Hayakawa et al. .......... 474/110 |
| 2005/0001190 | A1 * | 1/2005 | Shirase et al. .......... 251/129.15 |

FOREIGN PATENT DOCUMENTS

| GB | 406082 | 2/1934 |
| JP | 08-035546 | 2/1996 |
| JP | 2002-130401 | 5/2002 |
| JP | 2003-287093 | 10/2003 |

* cited by examiner

*Primary Examiner*—Robert A Siconolfi
*Assistant Examiner*—Thomas W Irvin
(74) *Attorney, Agent, or Firm*—Howson & Howson LLP

(57) ABSTRACT

In a hydraulic tensioner having a relief valve inside its plunger, a relief valve spring-receiving plug, press-fit into the plunger is formed by forging a plurality of flat surfaces on its exterior. These flat surfaces, in cooperation with the cylindrical inner wall of the plunger, form plural oil passages, each having a segment-shaped cross-section. The oil passages allow flow of oil past the plug to a discharge opening at the front end of the plunger, and the flow of oil is substantially unaffected by circumferential displacement of the oil passages on the periphery of the plug relative to the oil passages on the periphery of the relief valve seat.

9 Claims, 5 Drawing Sheets

HYDRAULIC TENSIONER WITH IMPROVED RELIEF VALVE

FIELD OF THE INVENTION

This invention relates to hydraulic tensioners of the type used for applying tension to a timing chain or the like in a vehicle engine, and more particularly to an improved relief valve in a hydraulic tensioner.

BACKGROUND OF THE INVENTION

Tensioners are widely used to maintain proper tension and prevent vibrations in power-transmitting chains. In a typical internal combustion engine timing drive, the tensioner is mounted on the engine, and applies pressure to a pivoted lever which is in sliding contact with the chain, thereby maintaining tension in the chain.

A hydraulic tensioner with a relief valve is described in United States Patent Application Publication No. 2002/0052259, published, May 2, 2002. The tensioner comprises a housing, and a hollow plunger, slidable in a hole in the housing, and protruding from the housing. A high pressure oil chamber is formed by the housing and the inside of the plunger. The plunger urged in the protruding direction by spring inside the high pressure oil chamber. Oil is introduced under pressure into the high pressure oil chamber through a check valve.

A relief valve is provided inside the plunger. The relief valve allows oil to flow out of the high pressure oil chamber through a discharge port in the protruding end of the plunger when the oil pressure in the high pressure oil chamber becomes excessive.

The relief valve comprises a relief valve seat press-fit into the hollow interior of the plunger, a valve body slidable into the valve seat, a biasing spring for biasing the valve body against the seat, and a separate, hollow, spring-receiving plug, also press-fit into the hollow interior of the plunger, for supporting the biasing spring. The relief valve seat includes a plurality of radial holes, and a plurality of axial grooves communicating with the radial holes. When the relief valve body moves away from its seat, oil in the high pressure oil chamber is allowed to flow outward through the radial holes, and axially, through the axial grooves, toward the spring-receiving plug.

One or more axial grooves are machined in the outer surface of the spring-receiving plug to allow oil, delivered through the relief valve, to flow past the plug toward the discharge opening at the protruding end of the plunger.

Because the spring-receiving plug and the relief valve seat are separately press-fit into the plunger, the axial grooves in the seat are not necessarily aligned with the axial grooves of the spring-receiving plug. Flow of oil through the discharge opening is dependent on the relative circumferential positions of the axial grooves in the seat and the plug. Thus, flow of oil can be impeded if the seat and plug are installed in such a way that the grooves are not in alignment, and performance of the relief valves can vary.

In addition, the depths of the axial groove or grooves formed on the outer surface of the spring-receiving plug are limited by the requirements for integrity and rigidity in the plug. Furthermore, the axial grooves in the plug are produced by machining, which requires a great deal of time and effort.

BRIEF SUMMARY OF THE INVENTION

An object of this invention is to provide a relief valve in a hydraulic tensioner, in which relative circumferential displacement of the valve seat and the spring-retaining plug, both of which are press-fit into the plunger, does not materially affect oil flow, or produce variations in tensioner performance. Another object of the invention is to provide for unimpeded flow of oil past the spring-retaining plug without impairing the rigidity and integrity of the plug. Still another object of the invention is to simplify the production of a tensioner and particularly the relief valve spring-retaining plug.

The hydraulic tensioner in accordance with the invention comprises a tensioner housing, having a plunger-receiving hole, and a hollow plunger slidable in the plunger-receiving hole and protruding from the housing. The plunger and the housing form a high pressure oil chamber, and a check valve is provided for introducing oil under pressure into the high pressure oil chamber. The plunger has a circumferential inner surface, a protruding end, an end wall at its protruding end, and an oil discharge opening in the end wall. A plunger-biasing spring urges the plunger in the protruding direction. A relief valve is provided within the plunger. The relief valve comprises a valve seat having an exterior, the valve seat being press-fit into the plunger, a valve body movable into and out of engagement with the valve seat, a valve body-biasing spring or urging the valve body into engagement with the valve seat, and a hollow, spring-receiving plug, also press-fit into the hollow plunger. The plug has an exterior surface, an interior space for receiving the valve body-biasing spring, and a bottom in engagement with an end of the valve body-biasing spring. The relief valve seat includes a plurality of axial passages on its exterior. These axial passages cooperate with the circumferential inner surface of the plunger to provide axial oil passages. A plurality of radial holes in the relief valve seat, communicating with the axial passages, allow oil to flow from the relief valve to the axial passages. The spring-receiving plug includes axial oil passages formed between the circumferential inner surface of the plunger and the spring-receiving plug when the spring receiving spring is press-fit into the hollow plunger, and radial oil grooves communicating with the axial oil passages and with the discharge opening formed in the end wall of the plunger. The axial oil passages are formed between the circumferential inner surface of the plunger and axial flat portions on the outer surface of the plug.

In an optional embodiment, the spring-receiving plug may include outer portions disposed between the axial flat portions and in press-fit relationship with said circumferential inner surface of the plunger, and another portion, extending axially beyond the axial flat portions and the outer portions, and having an outer peripheral surface all of which is spaced radially inward from the circumferential inner surface of the plunger.

Preferably, the axial flat portions of the spring-receiving plug are formed by forging.

When the spring-receiving plug is formed with axial flat portions, the cross-sectional shapes of the passages through which oil flows along the outside of the plug are in the form of segments of a circle, and the flow of oil along the path provided by the axial grooves of the relief valve seat and the segment-shaped passages on the outside of the plug is substantially unaffected by circumferential displacement of the flat portions of the plug relative to the grooves of the relief valve seat.

When the spring-receiving plug has a large diameter portion and a small diameter portion, oil flow is further improved. In addition, since the length of the part of the plug that is press-fit into the plunger is shorter, it is easier to incorporate the plug into the plunger.

In addition, since the axial flat portions on the outside of the spring-receiving plug may be formed by forging, machining of grooves on the outside of the plug is avoided, production is improved, and manufacturing costs can be reduced.

DETAILED DESCRIPTION OF THE PREFERRED EMBODIMENTS

Figure 1:
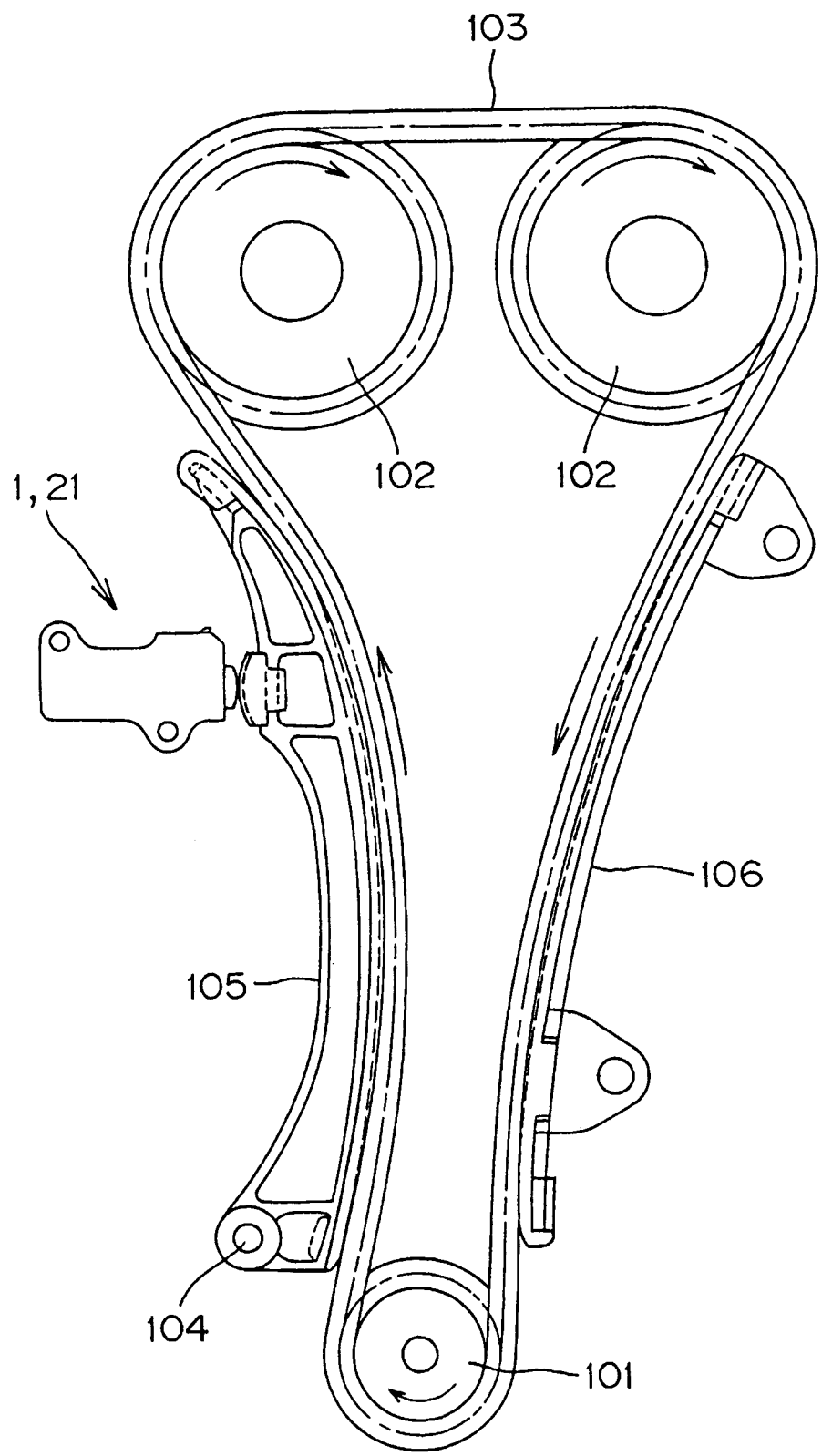
FIG. 1 is a schematic elevational view of the timing drive in an in-line, double overhead cam internal combustion engine provided with a hydraulic tensioner in accordance with the invention.

As shown in FIG. 1, a hydraulic tensioner 1 is attached to an engine block 2 adjacent the slack side of a timing chain 103, which is driven by a crankshaft sprocket 101, and in driving relationship with a pair of camshaft sprockets 102. The plunger of the tensioner presses against the back of a lever 105 pivotally supported on a pin 104 attached to the engine block. The plunger of the tensioner applies tension to a timing chain 103 through the lever 105. A guide 106, also attached to the engine block, is in engagement with the return side of the timing chain 103. Arrows in FIG. 1 indicate the direction of travel of the chain and the directions of rotation of the sprockets.

Figure 2:
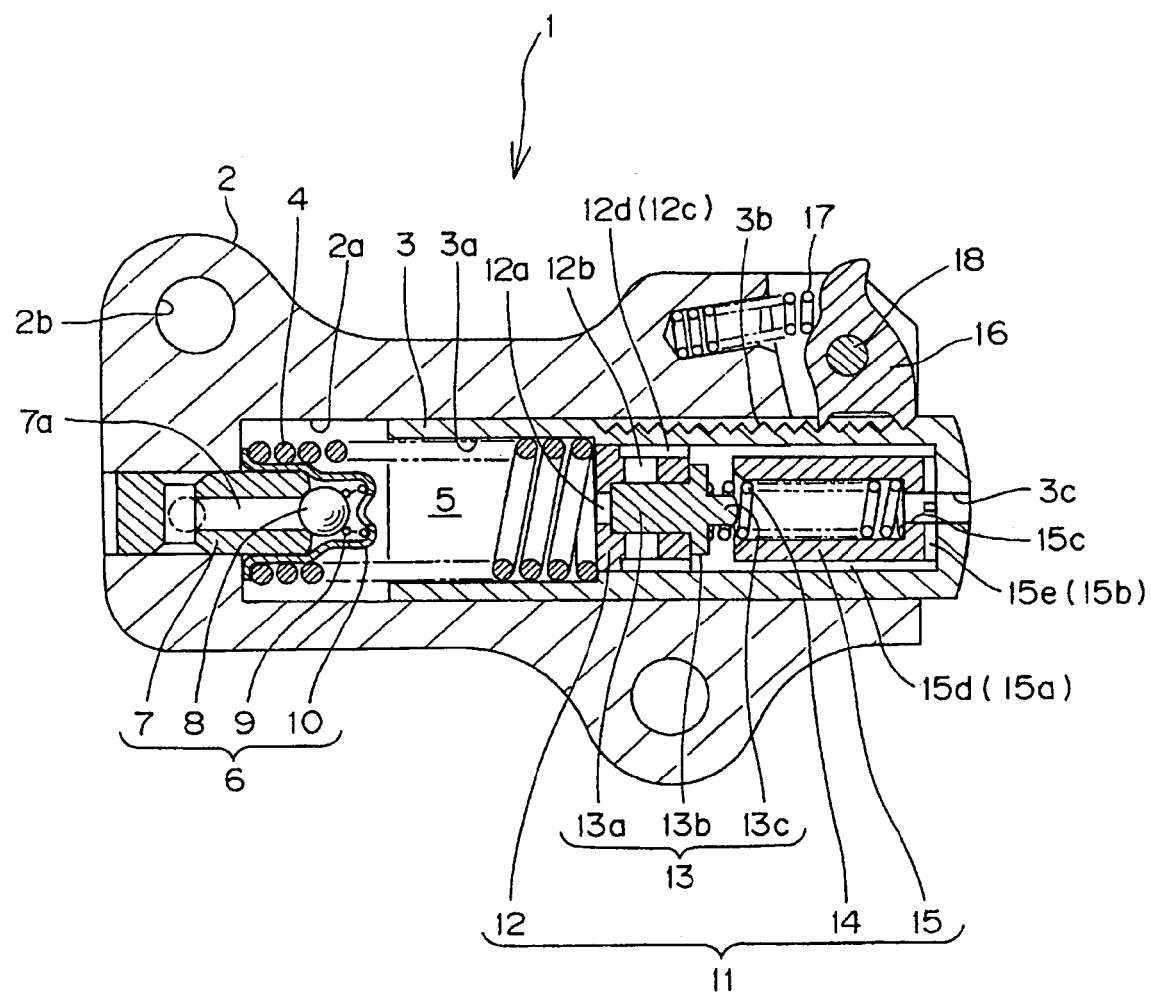
FIG. 2 is an axial cross-sectional view of a hydraulic tensioner having a relief valve in accordance with a first embodiment of the invention.

As shown in FIG. 2, the tensioner comprises a housing 2, a hollow, generally cylindrical, plunger 3 slidably disposed in a hole 2a in the housing and protruding from the housing. The hollow portion has an opening at the end of the plunger inside the housing, and a bottom, formed by the protruding end of the plunger. A high pressure oil chamber 5 is formed by the plunger-receiving hole 2a and a hollow interior portion 3a of the plunger. A check valve 6, incorporated into the housing 2, allows oil to flow into the high pressure oil chamber 5 but blocks reverse flow of oil. A relief valve 11 is incorporated into the hollow portion 3a of the plunger 3.

A plunger-biasing spring 4 urges the plunger 3 in the protruding direction. The plunger-biasing spring 4 is disposed in the plunger-receiving hole 2a of the housing 2, and in the hollow interior portion 3a of the plunger 3.

The check valve 6 is located in the bottom portion of the plunger-receiving hole 2a of the housing 2. The check valve 6 is composed of a ball seat 7 press-fit into the bottom portion of the plunger-receiving hole 2a, a check ball 8, a check ball biasing spring 9 and a retainer which supports the check ball biasing spring 9. The check ball 6 allows oil supplied from the outside through an oil supply passage 7a of the ball seat 7 to flow into the high pressure oil chamber, and prevents the flow of the oil out of the high pressure oil chamber 5.

The relief valve 11 is comprised of a relief valve seat 12 press-fit into the hollow portion 3a of the plunger 3, a valve body 13 slidably inserted into the relief valve seat 12, a valve body biasing spring 14 for biasing the valve body 13, and a hollow spring-receiving plug 15 with a bottom, press-fit into the hollow interior portion 3a of the plunger 3 for supporting the valve body biasing spring 14.

A stepped hole 12a, opening to the high pressure oil chamber 5, is formed in the center of the relief valve seat 12, and a plurality (typically four) of radial holes 12b, communicate with the stepped hole 12a. Plural concave axial grooves 12c are formed in the outer circumferential surface of the relief valve seat 12. The axial grooves 12c communicate with the radial holes 12b. A shoulder of the stepped communicating hole 12a forms a valve seat against which a shaft portion 13a of the valve body 13 abuts. As shown in FIG. 2, when the relief valve seat 12 is press-fit into the inner circumferential surface of the plunger 3, a plurality of axial oil passages 12d are formed by the inner circumferential surface of the plunger 3 and the axial grooves 12c.

The valve body 13 comprises a shaft portion 13a, a flange portion 13b and a supporting protrusion 13c, all being formed as a unit. The shaft portion 13a is slidable in the stepped hole 12a of the relief valve seat 12. The flange portion 13b faces a stop surface of a spring receiving plug, and the supporting protrusion 13c supports an end of the valve-biasing spring 14.

The valve-biasing spring 14 extends into the spring-receiving plug 15, and is disposed in compression between the valve body 13 and an end wall of the plug. The spring biases the valve body 13 in such a manner that the valve body 13 abuts the shoulder of the stepped hole 12a in the relief valve seat 12.

Figure 3:
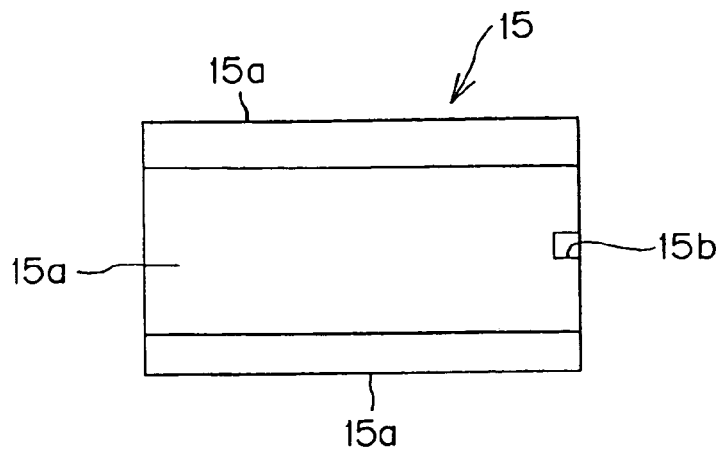
FIG. 3 is a side elevational view of the spring-receiving plug in the relief valve of the tensioner shown in FIG. 2.
Figure 4:
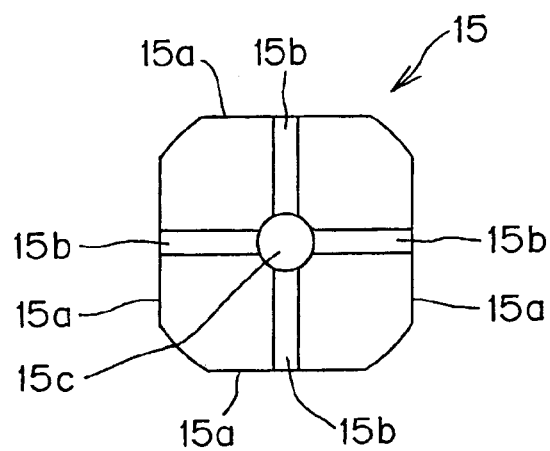
FIG. 4 is front elevational view of the spring-receiving plug, as viewed from the right side of FIG. 3.
Figure 5:
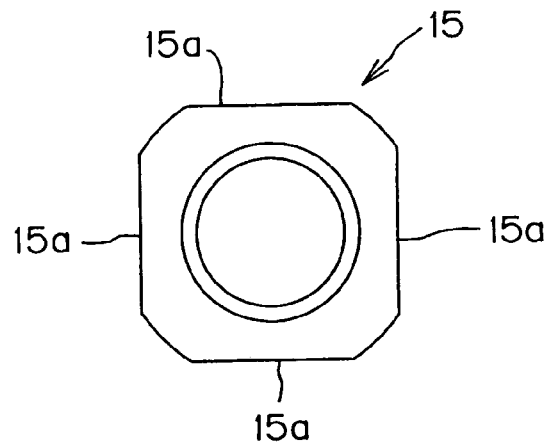
FIG. 5 is a rear elevational view of the spring-receiving plug, as viewed from the left side of FIG. 3.

As shown in FIGS. 3, 4 and 5, the spring-receiving plug 15 is a hollow element, having a uniform cross-sectional shape throughout most of its length. The cross-sectional shape, as seen in FIGS. 4 and 5, consists of four circular arcs connected by four axial flat portions 15a. The four axial flat portions 15a extend along the entire axial length of the plug. Concave radial grooves 15b are formed at one end of the plug to connect the flat portions to the opening 15c formed in an end wall of the plug. The four axial flat portions 15a are preferably formed by forging rather than by machining. As shown in FIG. 2, the face of the plug at the end opposite the end wall having the opening 15c, faces the valve body 13, and functions as a stop against which the valve body 13 abuts. When the spring-receiving plug 15 is press-fit into the interior of the plunger 3 as shown in FIG. 2, the arc-shaped portions of the outer circumferential surface of the spring-receiving plug are the surfaces that are press-fit against the inner circumferential surface of the plunger. Four segment-shaped axial oil passages 15d are formed by the inner circumferential surface of the plunger 3 and the axial flat portions 15a of the plug. The radial oil grooves 15e are formed by the interior of the front end of the plunger 3 and the concave radial grooves 15b. These radial oil grooves 15e communicate with a discharge opening 3c formed in the front end of the plunger 3.

A space between the relief valve seat 12 and the spring-receiving plug 15 allows for flow of oil from the grooves on the outside of the relief valve seat to the axial oil passages formed by the axial flat portions of the plug and the inner circumferential surface of the plunger. Thus, oil can flow freely regardless of the relative positions of the oil passages on the outside of the relief valve seat and the oil passages on the outside of the spring-retaining plug.

As shown in FIG. 2, a pawl 16, pivoted on a pin 18 on the tensioner housing, is biased by a biasing spring 17 into engagement with a rack 3b formed on the outer surface of the plunger 3. The pawl and rack block backward movement of the plunger 3, while allowing a small-amount of backlash.

Oil is continuously supplied into the high pressure oil chamber 5 through the check valve 6. When the timing chain 103 loosens, the plunger 3, which is continuously biased by the plunger-biasing spring 4 protrudes to restore tension in the chain. As the plunger protrudes, the check valve 6 opens so that oil flows into the high pressure oil chamber 5.

When an impact force acts on the plunger 3, pushing the plunger into the plunger-receiving hole 2a against the force exerted by the plunger-biasing spring 4, the plunger 3 moves in the retracting direction within a range allowed by the backlash between the rack 3b and the pawl 16. The oil pressure in the high pressure oil chamber 5 increases and reverse flow of the oil is blocked by check valve 6. As a result, the oil pressure in the high pressure oil chamber 5 is further increased. At this time, oil pressure acts on the valve body 13 through the stepped hole 12a of the relief valve seat 12, causing the valve body 13 to move away from its seat, allowing oil to flow outward through the radial relief holes 12b to the axial oil passages 12d, and through the axial oil passages 15d and the radial oil grooves 15e, so that oil is discharged through the discharge opening 3c at the end of the plunger.

Figure 6:
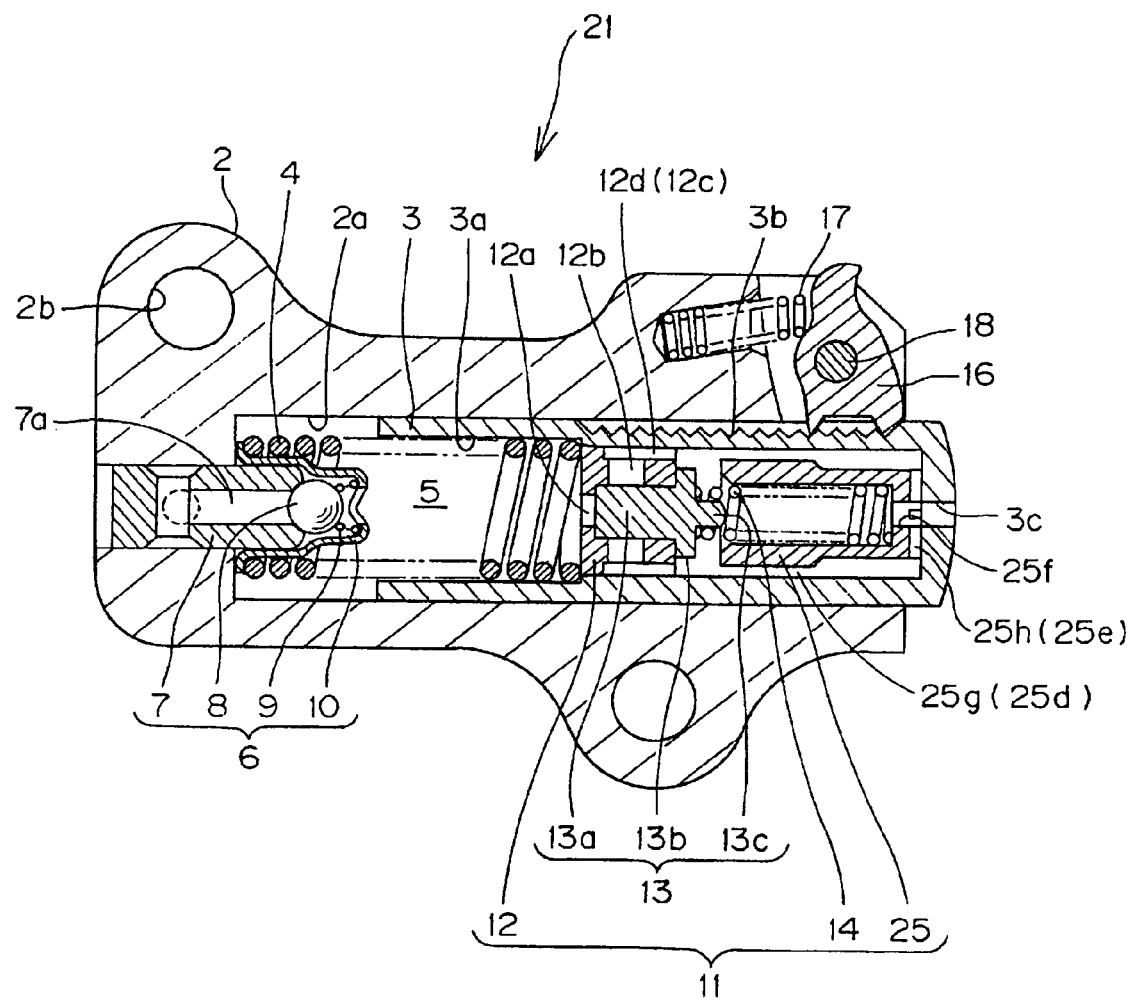
FIG. 6 is an axial cross-sectional view of a hydraulic tensioner having a relief valve in accordance with a second embodiment of the invention.

In the embodiment of the invention depicted in FIG. 6, the structure of the spring-receiving plug is different from that in FIG. 2, but the tensioner structure is otherwise the same as that of the embodiment in FIG. 2. Identical components in FIGS. 2 and 6 are designated by the same reference numerals.

Figure 7:
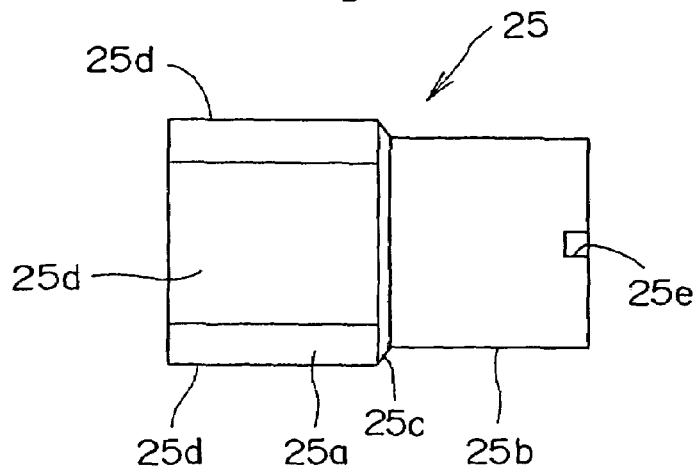
FIG. 7 is a side elevational view of the spring-receiving plug in the relief valve of the tensioner shown in FIG. 6.
Figure 8:
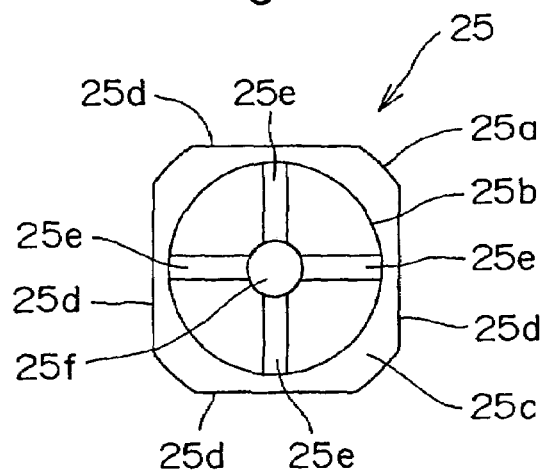
FIG. 8 is front elevational view of the spring-receiving plug, as viewed from the right side of FIG. 7.
Figure 9:
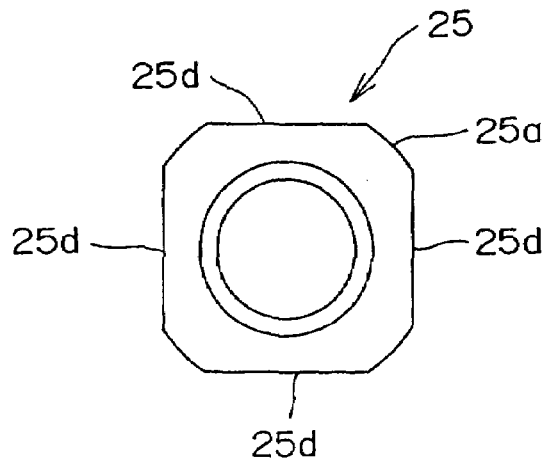
FIG. 9 is a rear elevational view of the spring-receiving plug, as viewed from the left side of FIG. 7.

As shown in FIGS. 7, 8 and 9, the hollow spring-receiving plug 25 has a large portion 25a and a smaller portion 25b, connected an inclined portion 25c. The outer surface of the large portion 25a is composed of plurality of axial flat portions 25d, preferably formed by forging rather than by machining, connected by arcuate parts, which are press-fit into the plunger. The smaller portion 25b is in the form of a circular cylinder, and has an axial through hole 25f, and radial grooves 25e formed in its end face. The end surface facing the valve body 13 functions as a stop against which the valve body 13 abuts. As shown in FIG. 6, when the larger portion 25a of the spring-receiving plug 25 is press-fit into the plunger 3, a plurality of axial oil passages 25g is formed by the inner circumferential surface of the plunger 3 and the axial flat portion 25d. Radial oil grooves 25h are formed by the interior of the end wall of the plunger 3 and the radial groove 25e. The radial oil grooves 25e communicate with a discharge opening 3c formed at an end portion of the plunger 3.

The operation of the embodiment shown in FIG. 6 is substantially the same as that of the embodiment shown in FIG. 2. However, since the length of the part of the plug that is press-fit into the plunger 3 is shorter in the case of FIG. 6, incorporation of the spring-receiving plug 25 into the plunger 3 is easier.

Various modifications can be made to the tensioner relief valve structure described above. For example instead of the axial grooves 12d in the relief valve seat, axial passages on the perimeter of the relief valve seat may be formed as flats by forging, in the same manner as the flat surfaces of the spring retainer, thereby avoiding machining steps. Although the relief valve spring-receiving plug has four flat surfaces, which simplifies manufacture by forging, the number of flat surfaces can vary. For example, the plug can be formed with three, or five or more, flat surfaces. Moreover, the invention can be embodied in a hydraulic tensioner in which the rack and pawl mechanism is omitted.

We claim:

1. A hydraulic tensioner comprising:
a tensioner housing, having a circular, cylindrical plunger-receiving hole symmetrical about a central axis;
a hollow plunger slidable, in the direction of said axis, in said plunger-receiving hole, and protruding, in a protruding direction, from the housing, said plunger having a circumferential inner surface, a protruding end, an end wall at its protruding end, and an oil discharge opening in said end wall, the plunger and the housing forming a high pressure oil chamber;
a check valve for introducing oil under pressure into the high pressure oil chamber;
a plunger-biasing spring urging the plunger in said protruding direction; and
a relief valve within said plunger, said relief valve comprising a valve seat having an exterior, said valve seat being press-fit into said hollow plunger, a valve body movable into and out of engagement with said valve seat, a valve body-biasing spring for urging the valve body into engagement with the valve seat, and a hollow spring-receiving plug, also press-fit into said hollow plunger, said plug having an exterior surface, an interior space for receiving the valve body-biasing spring, and a bottom in engagement with an end of the valve body-biasing spring;
wherein said relief valve seat includes a plurality of axial passages on its exterior, the axial passages cooperating with the circumferential inner surface of the plunger to provide axial oil passages, and a plurality of radial holes in the relief valve seat, communicating with said axial passages for allowing flow of oil from the relief valve to said axial passages;
wherein axial oil passages are formed between the circumferential inner surface of the plunger and the spring-receiving plug when the spring receiving plug is press-fit into the hollow plunger, and plural radial oil grooves are formed in the end wall of the plunger, said radial oil grooves cooperating with said end wall of the plunger to provide radial oil passages, each of said radial oil passages communicating with one of said axial oil passages and with said discharge opening formed in the end wall of the plunger;
wherein said spring-receiving plug has an outer surface comprising a plurality of flat surfaces disposed in planes parallel to and spaced from said axis and having opposite side edges meeting the circumferential inner surface of the plunger, and said axial oil passages are formed between the circumferential inner surface of the plunger and said axial flat portions on the outer surface of said plug; and
wherein the exterior surface of said spring-receiving plug includes outer portions disposed between said flat surfaces and in press-fit relationship with said circumferential inner surface of the plunger, and another portion extending axially beyond said flat surfaces and said outer portions, said another portion having an outer peripheral surface all of which is spaced radially inward from said circumferential inner surface of the plunger.

2. A hydraulic tensioner with a relief valve according to claim 1, wherein said flat surfaces are formed by forging.

3. A method of making a hydraulic tensioner comprising a tensioner housing, having a circular, cylindrical plunger-receiving hole symmetrical about a central axis;
a hollow plunger slidable, in the direction of said axis, in said plunger-receiving hole, and protruding, in a protruding direction, from the housing, said plunger having a circumferential inner surface, a protruding end, an end wall at its protruding end, and an oil discharge opening in said end wall, the plunger and the housing forming a high pressure oil chamber;

a check valve for introducing oil under pressure into the high pressure oil chamber;

a plunger-biasing spring urging the plunger in said protruding direction; and a relief valve within said plunger, said relief valve comprising a valve seat having an exterior, said valve seat being press-fit into said hollow plunger, a valve body movable into and out of engagement with said valve seat, a valve body-biasing spring for urging the valve body into engagement with the valve seat, and a hollow spring-receiving plug, also press-fit into said hollow plunger, said plug having an exterior surface, an interior space for receiving the valve body-biasing spring, and a bottom in engagement with an end of the valve body-biasing spring;

wherein said relief valve seat includes a plurality of axial passages on its exterior, the axial passages cooperating with the circumferential inner surface of the plunger to provide axial oil passages, and a plurality of radial holes in the relief valve seat, communicating with said axial passages for allowing flow of oil from the relief valve to said axial passages;

wherein said axial oil passages are formed between the circumferential inner surface of the plunger and the spring-receiving plug when the spring receiving plug is press-fit into the hollow plunger, and plural radial oil grooves are formed in the end wall of the plunger, said radial oil grooves cooperating with said end wall of the plunger to provide radial oil passages, each of said radial oil passages communicating with one of said axial oil passages and with said discharge opening formed in the end wall of the plunger;

wherein said spring-receiving plug has an outer surface comprising a plurality of flat surfaces disposed in planes parallel to and spaced from said axis and having opposite side edges meeting the circumferential inner surface of the plunger, and said axial oil passages are formed between the circumferential inner surface of the plunger and said axial flat portions on the outer surface of said plug; and wherein the exterior surface of said spring-receiving plug includes outer portions disposed between said flat surfaces and in press-fit relationship with said circumferential inner surface of the plunger, and another portion extending axially beyond said flat surfaces and said outer portions, said another portion having an outer peripheral surface all of which is spaced radially inward from said circumferential inner surface of the plunger;

the method comprising the steps of forming said axial flat portions of the spring-receiving plug by forging, and press-fitting said spring-receiving plug into said hollow plunger.

4. A hydraulic tensioner comprising:

a tensioner housing, having a circular, cylindrical plunger-receiving hole symmetrical about a central axis;

a hollow plunger slidable, in the direction of said axis, in said plunger-receiving hole, and protruding, in a protruding direction, from the housing, said plunger having a circumferential inner surface, a protruding end, an end wall at its protruding end, and an oil discharge opening in said end wall, the plunger and the housing forming a high pressure oil chamber;

a check valve for introducing oil under pressure into the high pressure oil chamber;

a plunger-biasing spring urging the plunger in said protruding direction; and a relief valve within said plunger, said relief valve comprising a valve seat having an exterior, said valve seat being press-fit into said hollow plunger, a valve body movable into and out of engagement with said valve seat, a valve body-biasing spring for urging the valve body into engagement with the valve seat, and a hollow spring-receiving plug, also press-fit into said hollow plunger, said plug having an exterior surface, an interior space for receiving the valve body-biasing spring, and a bottom in engagement with an end of the valve body-biasing spring;

wherein said relief valve seat includes a plurality of axial passages on its exterior, the axial passages cooperating with the circumferential inner surface of the plunger to provide axial oil passages, and a plurality of radial holes in the relief valve seat, communicating with said axial passages for allowing flow of oil from the relief valve to said axial passages;

wherein said axial oil passages are formed between the circumferential inner surface of the plunger and the spring-receiving plug when the spring receiving plug is press-fit into the hollow plunger, and plural radial oil grooves are formed in the end wall of the plunger, said radial oil grooves cooperating with said end wall of the plunger to provide radial oil passages, each of said radial oil passages communicating with one of said axial oil passages and with said discharge opening formed in the end wall of the plunger; and wherein said spring-receiving plug has an outer surface comprising a plurality of curved surfaces having arc-shaped cross-sections in section planes to which said axis is perpendicular, said curved surfaces conforming to, and being in press-fitting engagement with, the circumferential inner surface of the hollow plunger and being circumferentially spaced from one another, each said curved surface having a pair of side edges both extending substantially parallel to said axis, each said side edge of each said curved surface being connected to a side edge of a next circumferentially spaced curved surface by a flat surface formed on the outer surface of said plug, each said flat surface being disposed in a plane parallel to and spaced from said axis, each said flat surface having two opposite side edges each coinciding respectively with a side edge of one of said curved surfaces, said axial oil passages being formed between the circumferential inner surface of the plunger and said flat surfaces on the outer surface of said plug.

5. A hydraulic tensioner with a relief valve according to claim 4, wherein said flat surfaces are formed by forging.

6. A hydraulic tensioner according to claim 4, wherein said curved surfaces and said flat surfaces of the spring-receiving plug extend along a part of the axial length of the plug; wherein said plug includes another portion extending axially beyond said flat surfaces and said curved surfaces, said another portion having an outer peripheral surface all of which is spaced radially inward from said circumferential inner surface of the plunger; and wherein a part of said interior space for receiving the valve body-biasing spring is within a part of the plug on which said curved surfaces extend, and another part of said interior space is within said another portion of the plug.

7. A hydraulic tensioner with a relief valve according to claim 6, wherein said flat surfaces are formed by forging.

8. A hydraulic tensioner according to claim 4, wherein said curved surfaces and said flat surfaces of the spring-receiving plug extend along a part of the axial length of the plug; wherein said plug includes another portion extending axially beyond said flat surfaces and said curved surfaces, said another portion having an outer peripheral surface all of which is spaced radially inward from said circumferential inner surface of the plunger; and wherein said interior space for receiving the valve body-biasing spring extends through said part of the axial length of the plug and into said another portion of the plug.

9. A hydraulic tensioner with a relief valve according to claim 8, wherein said flat surfaces are formed by forging.

* * * * *